July 26, 1927.

C. A. VIDINGHOFF

WORK CLAMP

Filed June 20, 1923

INVENTOR.
Charles A. Vidinghoff
BY Davis & Simmo
his ATTORNEYS.

July 26, 1927.
C. A. VIDINGHOFF
1,637,134
WORK CLAMP
Filed June 20, 1923
3 Sheets-Sheet 2
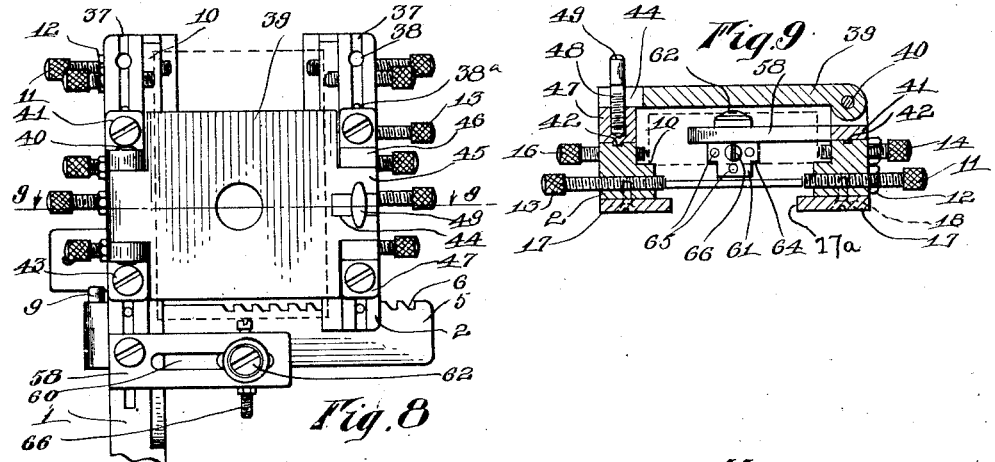
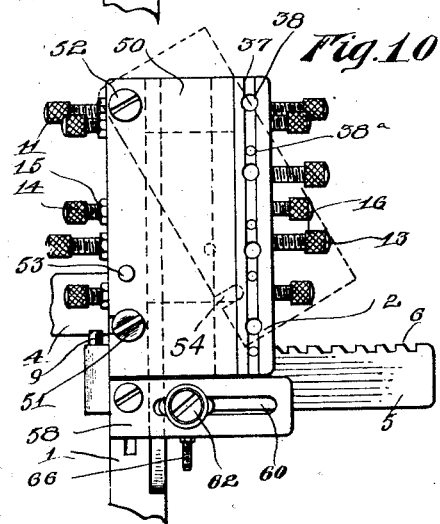
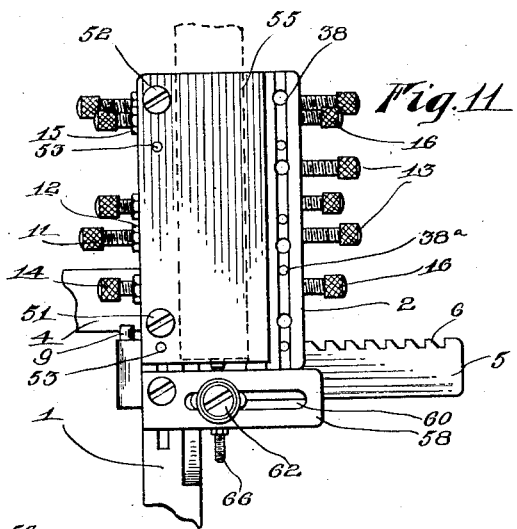
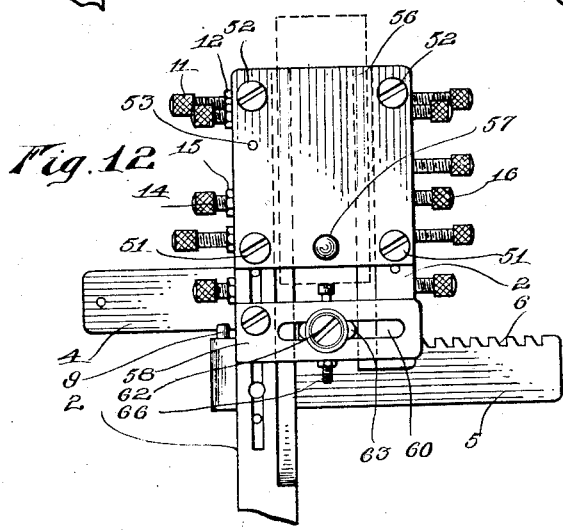
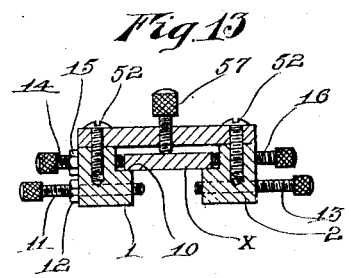
INVENTOR.
Charles A Vidinghoff
BY
his ATTORNEYS.

July 26, 1927. 1,637,134
C. A. VIDINGHOFF
WORK CLAMP
Filed June 20, 1923 3 Sheets-Sheet 3
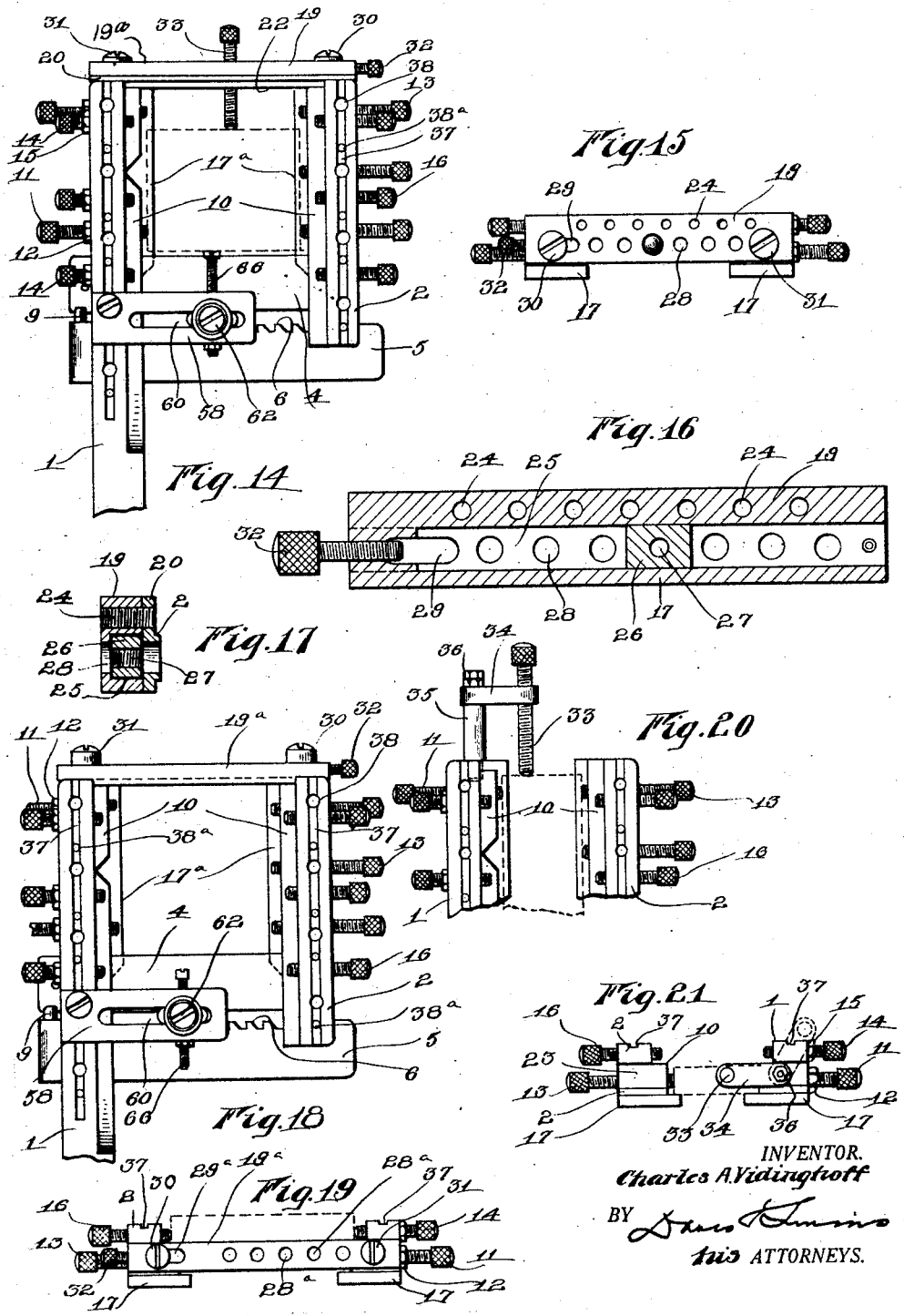

Patented July 26, 1927.

1,637,134

UNITED STATES PATENT OFFICE.

CHARLES A. VIDINGHOFF, OF ROCHESTER, NEW YORK, ASSIGNOR OF ONE-HALF TO ARTHUR R. PATTERSON, OF ROCHESTER, NEW YORK.

WORK CLAMP.

Application filed June 20, 1923. Serial No. 646,628.

The present invention relates to work clamps and more particularly to the type designed for use on the work tables of drill presses and other similar machines. An object of this invention is to provide a work clamp having a ledge on the opposed faces of its jaws with clamping screws above and below said ledges, so that the work piece may be securely held either on the ledges or below the latter. Still another object of the invention is to provide a stop attachment which may be rigidly connected to one of the jaws and will support a stop in any desirable position between the jaws. Another object of the invention is to provide a clamp of the type having two adjustably connected jaws with means for rigidly and accurately connecting a jig plate thereto. Still another object of the invention is to provide the jaws of a work clamp with longitudinally extending attachment positioning grooves in their upper faces as well as attachment positioning openings, so that suitable attachments may be rigidly and accurately positioned on the jaws. Still a further object of the invention is to provide means for tying the two jaws together at their free ends so that they will be held against expansion or separation by pressure on the work between them. Still another object of the invention is to provide a tying means which is adjustably connected to the jaws so that the jaws may be adjustable with reference to each other. Still a further object of the invention is to provide a tying means which may be utilized as a support for a screw adapted to act as a clamping screw. A still further object of the invention is to provide a tying means which has an adjustable connection with the jaws through a series of openings in the tying means and has a floating or shiftable nut mounted thereon to coincide with any one of the openings, so that such openings may also be utilized for the passage of a screw adapted to act as a clamping screw.

To these and other ends, the invention consists of certain parts and combinations of parts, all of which will be hereinafter described, the novel features being pointed out in the appended claims.

In the drawings:

Fig. 8 is a plan view of the clamp with one of the jig plates in position thereon;

Fig. 9 is a section on the line 9—9, Fig. 8;

Fig. 10 is a plan view of the clamp showing another jig plate in position thereon;

Fig. 11 is a plan view of the clamp showing still another jig plate in position thereon;

Fig. 12 is a plan view of a clamp showing still another jig plate in position thereon;

Fig. 13 is a transverse section through the form of the invention illustrated in Fig. 12 in the plane of the clamping screw on the jig plate.

Fig. 14 is a plan view of a clamp showing the tie piece in position thereon;

Fig. 15 is an end view of the clamp with the tie piece in position thereon;

Fig. 16 is a longitudinal section of the tie piece, illustrated in Fig. 15;

Fig. 17 is a transverse section through the tie piece illustrated in Fig. 16 in the plane of the shiftable nut.

Fig. 18 is a plan view of the clamp showing another embodiment of the tie piece;

Fig. 19 is an end view of the clamp with the tie piece thereon as illustrated in Fig. 18;

Fig. 20 is a fragmentary plan view of the clamp, showing a clamping or stop screw supported by one of the jaws; and Fig. 21 is an end view of the clamp as illustrated in Fig. 20.

Figure 1:
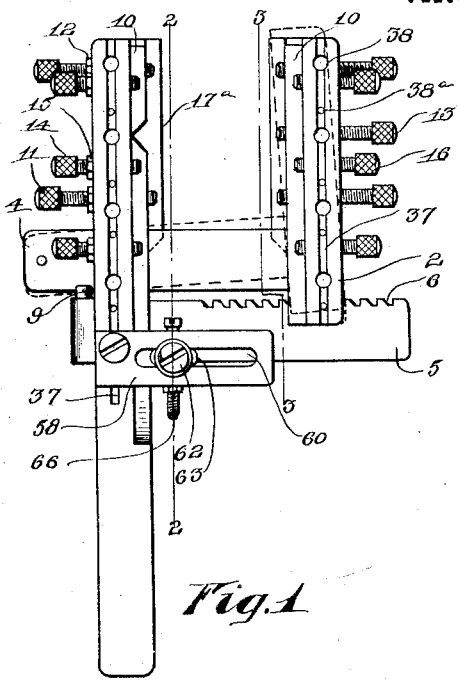
Fig. 1 is a plan view of a clamp with the ledge plates attached thereto and the stop attachment arranged in position.
Figures 2, 3:
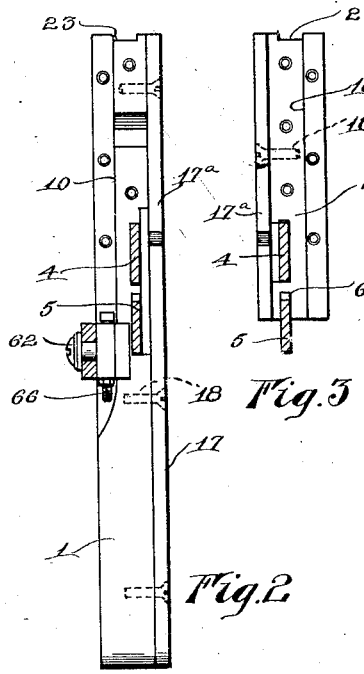
Fig. 2 is a section on the line 2—2, Fig. 1.
Fig. 3 is a similar section looking in the opposite direction.
Figure 4:
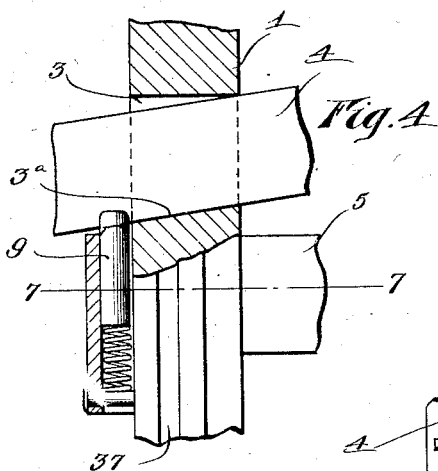
Fig. 4 is a fragmentary sectional view showing the manner in which one jaw connects with the other.
Figure 5:
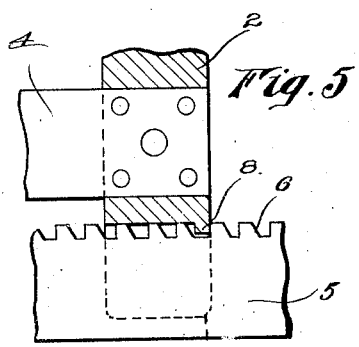
Fig. 5 is a fragmentary sectional view showing the manner of locking the jaws against separation.
Figure 7:
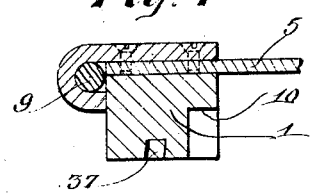
Fig. 7 is a section on the line 7—7, Fig. 4.
Figure 6:
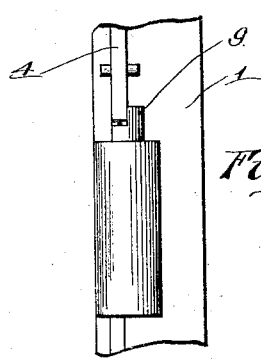
Fig. 6 is a fragmentary detail view of the spring plunger.

In the illustrated embodiment of the invention, there are employed two clamping members 1 and 2, the clamping member 1 has an opening 3 extending therethrough and receiving an arm 4 extending laterally from the clamping member 2. An arm 5 extends laterally from the clamping member 1 at right angles to the latter and is provided at one edge with a longitudinal series of notches or recesses 6. This arm 5 is straddled by the bi-furcated end 7 of the clamping member 2 and at the bottom of the bi-furcation a tooth 8 is provided adapted to enter in any one of the notches 6 to hold the jaw 2 in adjusted position with reference to the jaw 1. The opening 3 has a wall $3^a$ at an angle other than a right angle to the opposite wall which permits the arm 4 to rock in the opening 3, so that the tooth 8 may be engaged in any one of the notches 6. A spring pressed plunger 9 on the jaw 1 acts on the arm 4 to hold the jaw 2 in parallel relation with the jaw 1 and moves to permit the rocking of the arm 4 on the jaw 1.

The opposite faces of the jaws 1 and 2 are parallel, so that the holder as a whole may rest in a flat condition by means of either face upon the table of a drill press or other machine. The opposed faces of the jaws 1 and 2 are formed with ledges 10, one on each jaw lying in the same plane and acting as a rest or support so that material may be held between the jaws and on the ledges in spaced relation to the table or work support of the drill press or machine.

The notches 6 in the arm 5 and the tooth 8 form a rough adjustment between the jaws, but in some cases this does not provide for holding the work piece against movement between the jaws, so that fine adjusting means is provided. This fine adjusting means, in this instance, embodies two sets of adjusting devices, namely, a set of screws 11 with nuts 12 thereon together with screws 13, both arranged on one side of the ledges 10 and screws 14 with nuts 15 thereon, together with screws 16 arranged on the opposite side of the ledges 10, the screws 11 and 13 serving to hold the material below the ledges, and the screws 14 and 16 serving to hold the material on the ledges.

In some instances, it is desirable to provide another set of ledges on the clamping member and with this end in view, ledge forming plates 17 are employed and are detachably secured to the under faces of the jaws 1 and 2 by screws 18, these plates having widened portions $17^a$ which form the ledges.

With the end in view of providing means for holding the free ends of the jaws against separation due to a pressure between them tending to expand them, tying means is provided. One embodiment of the tying means is illustrated in Figs. 14, 15, 16, 17 and 18. This tying means in this embodiment comprises a bar $19^a$ formed of two members 19′ and 20 secured together by screws 30 and 31. The member 20 has a longitudinally extending rib 22 which is adapted to fit in notches 23 formed in the ends of the jaws 1 and 2. This bar is formed with a longitudinally extending series of screw openings 24 and a longitudinally extending pocket or chamber 25 in which a nut 26 is mounted to slide or float, said nut having a screw opening 27. The opposite walls of the chamber or pocket 25 have openings 28 and near one end of the bar a longitudinally extending slot or opening 29 is provided. A bolt 30 is adapted to pass through the slot 29 and to be anchored in the end of the jaw 2, while the bolt 31 is adapted to pass through any one of the series of openings 28 to be anchored in the jaw 1. An adjusting screw 32 operates in one end of the bar to project into the end of the slot 29, so that the tying bar adjustably connects with the jaw 2, the reason for this being that the distance between the openings 28 is greater than the distance between the notches 6, thus enabling one adjustment of the screws 30 and 31 to be adapted to a number of adjustments of the jaw 2 with reference to the jaw 1. The tying means, in the embodiment shown in Figs. 14 to 18, inclusive, also serves as a support for a screw 33 which will act as a clamping screw for material positioned between the jaws 1 and 2. This screw 33 may be positioned in the upper series of openings 24 when the material is positioned above the ledges 10 or may extend through the nut 26 and one of the openings 28 when the material is positioned below the ledges 10. It will thus be seen that the nut 26 makes it possible to utilize the openings 28 for an anchoring means for the adjusting screw 33 or for the passage of the screw 31 when the nut is shifted out of the way.

In the embodiment shown in Figs. 18 and 19, the tying means is in the form of a bar $19^a$ which has a single set of openings $28^a$ and a slot $29^a$. The screws 30 and 31 pass, respectively, through the slot $29^a$ and one of the openings $28^a$ and the adjusting screw 32 cooperates with the screw 30, so that the bar is adapted for tying the jaws 1 and 2 together, notwithstanding the fact that the distance between the openings $28^a$ is greater than the distance between the notches 6. This form of tying means does not serve as a support for a clamping screw, but merely acts to tie the jaws together. Its width is such that it will readily fit in the notches 23 formed in the ends of the jaws 1.

The clamping screw 33 may also be supported from one of the jaws alone. this result being, in this instance, secured by the provision of an arm 34 through which the screw 33 passes, this arm being rotatably mounted on a post 35 which is screwed in the end of one of the jaws and has securing and clamping nuts 36 thereon for securing the arm 34 in an adjusted position in the post. This arrangement permits the clamping screw 33 to be swung laterally with the arm 34 as illustrated in Fig. 21.

The form of clamp herein illustrated especially lends itself for accommodation with the jig plate through which a hole to be drilled or cut in the work piece clamped by the jaws may be accurately positioned. With this result in view the jaws are preferably provided in their upper faces, each with a longitudinally extending attachment positioning groove 37 and also with a series of longitudinally extending screw openings 38 and also with attachment positioning openings 38$^a$.

In the embodiment of the invention illustrated in Figs. 8 and 9 the drill plate 39 is hinged at 40 to a supporting member 41 which has a rib 42 on its under side lying in the groove 37 and held therein by screws 43 anchored in the openings 38. The other side of the drill plate is slotted at 44 and has a reduced portion 45 which lies between the two abutments 46 formed on a supporting member 47, the latter having a rib 42 lying in the groove 37 of the jaw 2. A holding screw 48 with an elongated head 49 is rotatable in the support 47 and is adapted to have the slot 44 pass thereover, when the jig plate swings to and from operative position. The turning of the holding screw locks the jig plate in operative position. It is apparent that any number of these jig plates may be provided to meet the different distances between the jaws as well as the different openings to be provided in the work piece.

Another form of jig plate is shown at 50 which is adapted to be supported on one of the jaws alone. This jig plate is provided with three openings. One of these openings receives a screw 51 entering one of the openings 38, another a screw 52 also entering an opening 38, and another a positioning pin 53 entering one of the positioning openings 38$^a$. The opening 54 in which the screw 51 fits is in the form of a slot opening at one side of the jig plate. With this arrangement by loosening the screws 51 and 52 and removing the positioning pin 53 the plate may be swung on the pin 52 as a pivot.

Still another jig plate is illustrated in Fig. 11, at 55, being supported on one of the jaws by two screws 51 and 52 and held in accurate position thereon by two positioning pins 53.

Still another jig plate is illustrated in Fig. 12, at 56. This jig plate is held to both jaws 1 and 2 by screws 51 and 52 and is accurately positioned by a positioning pin 53. This jig plate also can be utilized as a support for a clamping screw 57 passing therethrough and engaging the work piece ($x$) supported on the ledge 10, as illustrated in Fig. 13.

An adjustable stop attachment may be provided for positioning the work piece ($x$) between the jaws. In this instance, this stop attachment comprises an arm 58 having a positioning rib on its under side received within the positioning grooves 37 of the jaw 1 and extending laterally from said jaw adjacent the bar 5. This arm has a longitudinal guide slot 60 in which a stop frame 61 is adjustable through a screw 62, the stop frame having a projection 63 operating in the slot 60 to prevent the turning of the frame. The frame depends from the arm 58 and is notched at 64 on opposite sides so as to project above the ledge 10 on the two jaws when the latter are close together. The portion between the notches 64 is provided with a screw opening 65, while the portion above the notches 64 is provided with three screw openings 65 any one of said openings receiving the stop screw 66. When the work is clamped below the ledge 10, the openings 65 between the notched portions 64 may be utilized by the screw 66 whereas, when the work is positioned above the ledge 10, the most desirable opening 65 above the notches 64 may be employed.

From the foregoing it will be seen that there has been provided a work clamp which has detachable ledge forming plates, provision being made for adjustably tying the jaws of the clamps to prevent their spreading during use. In one embodiment this tying means has two sets of openings, one arranged above ledges on the jaws and the other arranged below the ledges. A clamping screw is adjustable in the upper set of openings, while the lower set of openings have two functions, one providing for the adjustment of the jaws on the clamping tool and the other for the anchoring of a clamping screw, there being associated with the openings for the latter purpose a shifting nut. The upper faces of the clamping jaws are formed with positioning means, in this instance, in the form of longitudinally extending grooves and also openings, so that jig plates and other attachments may be accurately positioned on the jaws. A stop attachment is provided which has a supporting portion adapted to be secured to one of the jaws to extend laterally therefrom, the stop carrier being adjustable on this supporting portion and carrying a stop, so adjustable, that it may cooperate with ledges on the opposed faces of the jaws or work above such ledges.

What I claim as my invention and desire to secure by Letters Patent is:

1. In a work clamp, the combination with a pair of clamping jaws, means adjustably connecting said jaws, and a tie piece for the ends of said jaws, of means for adjustably connecting said tie piece to the jaws embodying screws passing through the tie piece and into the jaw ends, the tie piece being provided with a longitudinally extending slot through which one of the screws passes, and an adjusting screw carried by the tie piece and engaging the screw in the slot.

2. In a work clamp, the combination with a pair of clamping jaws, means for adjustably connecting said jaws and a tie piece for the ends of the jaws, of means for adjustably connecting said tie piece to the jaw ends embodying screws passing through the tie piece and into the jaw ends, the tie piece being provided with a longitudinal series of openings through which any one of the screws may pass, and means for preventing the rocking of the tie piece on the screws.

3. In a work clamp the combination with a pair of clamping jaws, means for adjustably connecting said jaws, and a tie piece for the ends of the jaws, of means for adjustably connecting said tie piece to the jaw ends embodying screws passing through the tie piece and into the jaw ends, the tie piece being provided with a longitudinal series of openings through any one of which one of the screws may pass and also being provided with a longitudinally extending slot through which the other screw may pass, and an adjusting screw carried by the tie piece and engaging the screw in the slot.

4. In a work clamp the combination with a pair of clamping jaws, means for adjustably connecting said jaws, and a tie piece for the ends of the jaws, of means for adjustably connecting said tie piece to the jaw ends embodying screws passing through the tie piece and into the jaw ends, the tie piece being provided with a longitudinal series of openings through any one of which one of the screws may pass and also being provided with a longitudinally extending slot through which the other screws may pass, an adjusting screw carried by the tie piece and engaging the screw in the slot, and means preventing the rocking of the tie piece in the screws.

5. In a work clamp the combination with a pair of clamping jaws, means for adjustably connecting said jaws, and a tie piece for the ends of the jaws, of means for adjustably connecting said tie piece to the jaw ends embodying screws passing through the tie piece and into the jaw ends, the tie piece being provided with a longitudinal series of openings through any one of which one of the screws may pass and also being provided with a longitudinally extending slot through which the other screw may pass, an adjusting screw carried by the tie piece and engaging the screw in the slot, and means preventing the rocking of the tie piece in the screws, embodying a longitudinally extending rib on the tie piece engageable within recesses in the ends of the jaws.

6. A work clamp comprising a pair of jaws, means adjustably connecting said jaws adjacent one end thereof, a tie piece adjustably connecting said jaws adjacent the opposite end in the plane of said jaws, a clamping screw for clamping work held between the jaws, and means on the tie piece for permitting said clamping screws to be shifted to different positions longitudinally of the tie piece.

7. A work clamp comprising a pair of clamping jaws, means adjustably connecting said jaws, a tie piece secured to both jaws, a nut movable longitudinally of and on the tie piece, and a clamping screw operating in the nut, so that the position of the screw may be shifted with the nut in order to clamp material held between the jaws.

8. A work clamp comprising a pair of jaws having ledges on their opposed faces, means adjustably connecting said jaws, a tie piece provided with a series of openings above the ledges, bolts securing the tie piece to the jaws, a nut shiftable on the tie piece, and a screw adapted to pass through the nut or through any one of the series of openings to cooperate, in one instance, with material above the ledges and, in the other instance, with material below the ledges.

9. A work clamp comprising a pair of clamping jaws, means adjustably connecting said jaws, a tie piece provided with a longitudinally extending channel and a longitudinal series of bolt openings intersecting said channel, bolts securing said tie piece to the jaws, one of the bolts passing through one of the bolt openings of the longitudinal series, a nut movable in said channel, and a clamping screw passing through one of the longitudinal extending series of openings and through the nut.

10. A work clamp comprising a pair of jaws having ledges on their opposed faces, means for adjustably connecting said jaws, a tie piece provided with two longitudinal series of openings, one series above the ledges and one series below the ledges, bolts, one of which is adapted to be fitted in any one of said series of openings to secure the tie piece adjustably to the jaws, a nut shiftable with relation to said series of openings in the tie piece, and a screw adapted to be passed through the nut or through any one of said other series of openings to cooperate in one instance with material below the ledges and in the other instance with material above the ledges.

11. A work clamp comprising a pair of jaws provided with ledges on their opposed faces, means adjacent one end of the jaws for adjustably connecting said jaws together, a tie piece adjustably connecting the jaws at their opposite ends, and a clamping screw, movable on the pen, said tie piece having means permitting the clamping screw to be shifted to cooperate with work below the ledges or with work above the ledges.

12. A work clamp comprising a pair of jaws provided with ledges on their opposed faces, means for adjustably connecting the jaws, a jig plate, means for securing the jig plate to the tops of both jaws to bridge the space between the jaws, and a clamping screw carried by the jig plate to cooperate with the work on the ledges.

13. A work clamp comprising two jaws, one of which is provided with a longitudinal series of bolt openings in its upper face, and a groove intersecting said bolt openings, a stop support having a rib adapted to fit in said groove and having a bolt opening through which a bolt may be passed to engage in any one of the bolt openings of the jaw, said stop support extending laterally from the jaw, and a stop adjustably supported on said support.

14. A work clamp comprising two jaws provided with ledges on their opposed faces, a stop support secured to one of said jaws and extending laterally therefrom toward the other jaw, and a stop adjustable on said support to cooperate with material above or below said ledges.

15. A work clamp comprising two jaws, each provided with a longitudinal series of bolt openings in its upper face, and a groove intersecting said bolt openings, a stop support having a rib adapted to fit in either one of said grooves and also having a bolt opening through which a bolt may be passed to engage in one of the bolt openings of the jaw to hold the stop support to the jaw, said stop support extending laterally from the jaw and being provided with a longitudinally extending guide, a stop carrier adjustable on said stop support and a stop on said carrier.

16. A work clamp comprising two jaws provided with ledges on their opposed faces, a stop support secured to one of said jaws and extending laterally therefrom toward the other jaw, said support being provided with a longitudinally extending guide, a stop carrier depending from said stop support between the jaws, and a stop adjustable on said carrier to cooperate with material above and below said ledges.

CHARLES A. VIDINGHOFF.